United States Patent [19]
DeFreitas et al.

[11] Patent Number: 5,695,328
[45] Date of Patent: Dec. 9, 1997

[54] IGNITION APPARATUS USING ELECTROSTATIC NOZZLE AND CATALYTIC IGNITER

[75] Inventors: Dennis Michael DeFreitas, Oxford, N.Y.; Ervin Jack Sweet, Trumbull, Conn.

[73] Assignee: Simmonds Precision Engine Systems & Precision Combustion, Richfield, Ohio

[21] Appl. No.: 742,284

[22] Filed: Oct. 31, 1996

Related U.S. Application Data

[63] Continuation of Ser. No. 317,959, Oct. 4, 1994, abandoned.

[51] Int. Cl.⁶ .................................................. F23Q 11/00
[52] U.S. Cl. ........................ 431/268; 431/258; 431/353
[58] Field of Search ............................... 431/258, 353, 431/1, 2, 268, 267; 60/39.822; 239/705, 706, 707, 690

[56] References Cited

U.S. PATENT DOCUMENTS

| | | | |
|---|---|---|---|
| 2,929,211 | 3/1960 | Meyer et al. | 60/39.822 |
| 3,537,804 | 11/1970 | Walbridge | 431/66 |
| 3,749,545 | 7/1973 | Velkoff | 431/2 |
| 3,841,824 | 10/1974 | Bethel | 431/2 |
| 4,035,131 | 7/1977 | Cerkanowicz | 431/6 |
| 4,082,070 | 4/1978 | Saufferer et al. | 123/119 E |
| 4,124,003 | 11/1978 | Abe et al. | 123/119 E |
| 4,173,206 | 11/1979 | Masaki | 123/119 E |
| 4,198,939 | 4/1980 | Masaki | 123/119 EC |
| 4,255,777 | 3/1981 | Kelly | 361/228 |
| 4,258,885 | 3/1981 | Legaza | 239/707 |
| 4,344,401 | 8/1982 | Masaki | 123/536 |
| 4,345,555 | 8/1982 | Oshima et al. | 123/272 |
| 4,380,786 | 4/1983 | Kelly | 361/228 |
| 4,380,978 | 4/1983 | Maynard, Jr. et al. | 123/536 |
| 4,414,901 | 11/1983 | Sellwood | 431/79 |
| 4,439,980 | 4/1984 | Bibarz et al. | 60/39.06 |
| 4,582,981 | 4/1986 | Brooks et al. | 219/270 |
| 4,605,485 | 8/1986 | Cerkanowicz | 204/302 |
| 4,618,432 | 10/1986 | Mintz et al. | 210/748 |
| 4,627,903 | 12/1986 | Chapman et al. | 204/275 |
| 4,630,169 | 12/1986 | Kelly | 361/225 |
| 4,666,678 | 5/1987 | Lemelson | 422/186 |
| 4,702,808 | 10/1987 | Lemelson | 204/157.41 |
| 4,825,658 | 5/1989 | Beebe | 60/748 |
| 4,896,636 | 1/1990 | Pfefferle | 123/145 |
| 4,898,531 | 2/1990 | Goldstein et al. | 431/79 |
| 4,938,019 | 7/1990 | Angeil et al. | 60/39.06 |
| 4,991,774 | 2/1991 | Kelly | 239/3 |
| 4,994,422 | 2/1991 | Goldman . | |
| 5,093,602 | 3/1992 | Kelly | 313/231.01 |
| 5,146,881 | 9/1992 | Pfefferle | 123/145 A |
| 5,531,066 | 7/1996 | Pfefferle et al. | 431/268 |

FOREIGN PATENT DOCUMENTS

| | | | |
|---|---|---|---|
| 2356883 | 3/1978 | France | 431/79 |
| 0972302 | 4/1960 | United Kingdom . | |
| 1473694 | 7/1974 | United Kingdom . | |

OTHER PUBLICATIONS

Simmons et al., "Electrostatic Spraying of Oil–Based Agricultural Products".

"The Electrostatic Atomization of Hydrocarbons," Journal of the Institute of Energy, Jun. 1984.

Primary Examiner—James C. Yeung
Attorney, Agent, or Firm—Leonard L. Lewis; William E. Zitelli

[57] ABSTRACT

Apparatus and methods for igniting fuel include an electrostatic fuel nozzle that produces an atomized fuel spray; and a catalytic igniter for igniting the atomized fuel spray.

19 Claims, 3 Drawing Sheets

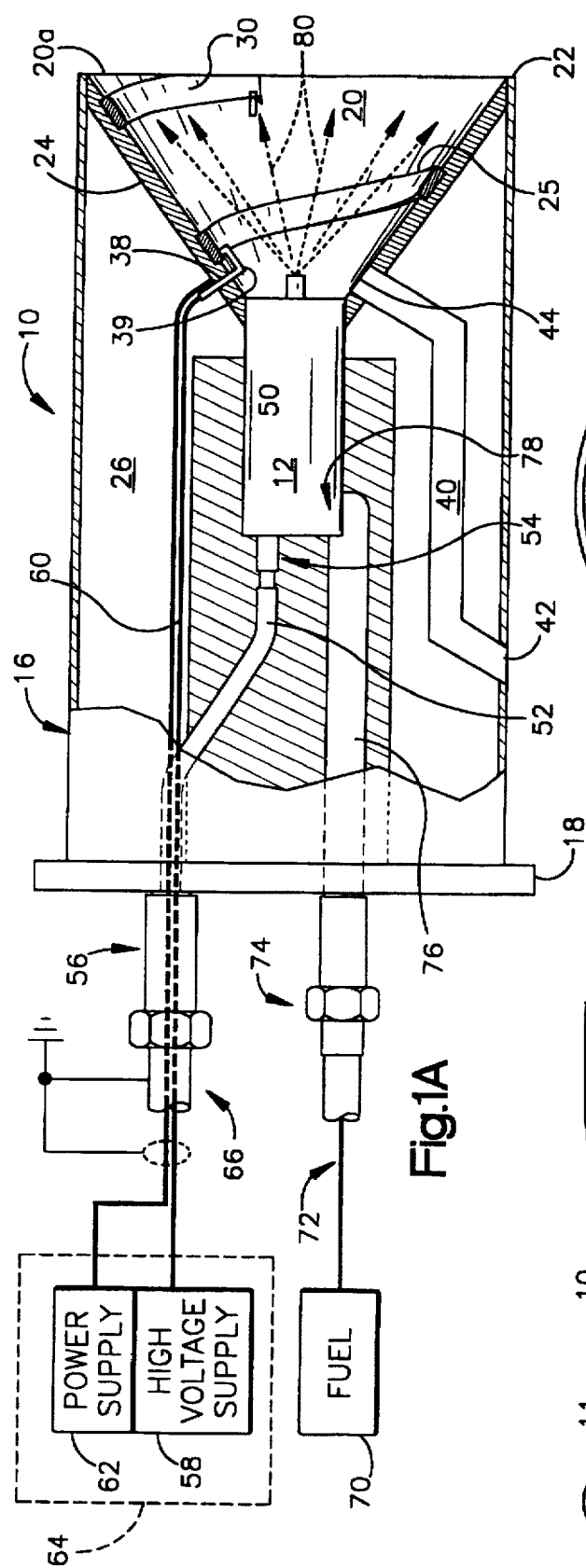
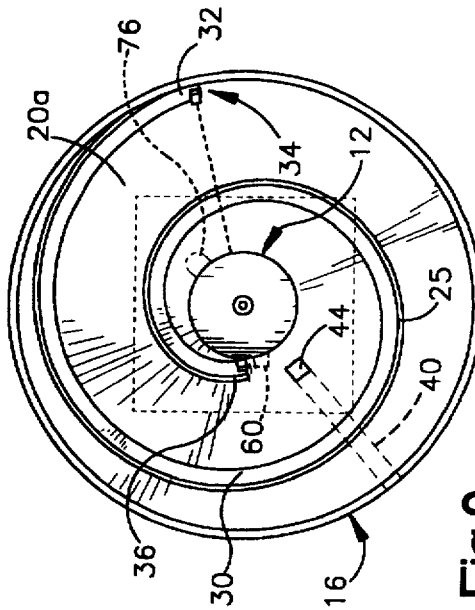
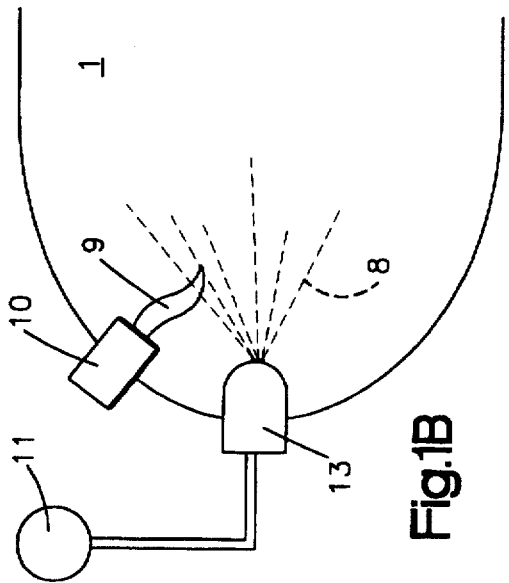

IGNITION APPARATUS USING ELECTROSTATIC NOZZLE AND CATALYTIC IGNITER

This is a continuation of application Ser. No. 08/317,959 filed Oct. 4, 1994, now abandoned.

BACKGROUND OF THE INVENTION

The invention relates generally to fuel ignition and, more particularly, ignition methods and apparatus utilizing an electrostatic fuel nozzle and catalytic igniter.

Fuel delivery systems, such as can be used in engine combustors, play an important part in the ability to initiate, maintain and restart combustion. In known combustors, the fuel nozzles typically include a primary orifice and one or more secondary orifices. The purpose of the nozzle is to provide a fine fuel spray that initially can be ignited. After combustion starts, the secondary orifices are opened to increase fuel flow.

The ease with which fuel can be ignited depends on many factors including fuel temperature, the type of igniter used, amount of ignition energy delivered, point of ignition energy delivery and the degree to which the fuel is atomized by the nozzle via the primary orifice. The atomization process is also important with respect to the overall efficiency of the fuel combustion.

Known atomizing fuel nozzles include fuel pressure atomizers and air blast atomizers and combinations thereof. A fuel pressure atomizer uses a combination of high fuel pressure and orifice geometry to force atomization to occur. Fuel pressure is used to raise the energy of the fuel as it exits the nozzle, resulting in shearing of the liquid into small droplets. Droplet sizes are distributed in the form of a bell shaped curve. Thus, there will be large and small droplet size distributions around an average size droplet. The size distribution affects combustion because the larger the droplet size, more energy is needed and the more difficult it is to ignite and burn. Also, if the droplet sizes are too large, or if the air/fuel mixture is fuel rich, either condition will result in low burn efficiency and incomplete combustion. Incomplete combustion of the fuel produces black smoke (i.e. soot.) Increased levels of soot production can cause a variety of operational problems such as plug fouling and higher gas flow temperatures. Fuel pressure atomizers must also have an operating pressure that can overcome the pressure build up that occurs in the combustion chamber. When flame out occurs, fuel pressure and air flow can deteriorate rapidly, making relight difficult. This is further exacerbated when the flame out occurs in a lean operating environment.

Air blast atomizing nozzles use air pressure to atomize the fuel. Typically, such nozzles include an annulus for high speed air. The high air velocity provides the energy required to atomize the fuel stream into small particles. The air blast atomizer thus does not require high fuel pressures. However, the need for high speed air makes the air blast nozzle less than ideal for relight in a low pressure operating environment.

Low temperature ambient conditions present further difficulty for ignition and restart using conventional nozzles. This is because at low temperature the fuel viscosity can increase substantially, thus increasing droplet size.

Fuel ignition in combustors also requires an igniter device to initiate the combustion process. Known igniters include plasma type spark plugs and conventional glow plugs. Typically, the spark plug is mounted in a combustor wall near the fuel nozzle. In a conventional combustor, the primary zone or optimum region for ignition is the high turbulence region down stream of the nozzle outlet. However, the igniter cannot protrude down into this optimum region because it would be destroyed by the fuel combustion process. Retractable igniters are sometimes used with industrial furnaces.

With the spark plug, a high energy plasma, high temperature spark kernel protrudes into the combustion chamber. However, there are numerous disadvantages including the fact that the fuel/air mixture is not optimum in this region, and that the combustor wall tends to act as a heat sink and quench the intensity of the spark. Obviously, combustors are designed so that this type of ignition arrangement works, but it is less than ideal.

A known alternative to the spark kernel is the use of a torch burner which creates a flame that is used to ignite the main fuel supply in the primary zone of the combustion chamber (Refer to illustration of FIG. 1B). Known torch burners, however, still produce less than ideal results because of their reliance on conventional fuel supply nozzles and orifices. Under adverse conditions such as low temperature and lean fuel conditions they can experience relight difficulties.

Conventional plasma type spark plugs are commonly used for igniters. Unfortunately, by their very nature of using high voltage/current plasma discharge, they exhibit considerable electrode degradation and must be routinely replaced. Also, less than optimum combustion can produce plug fouling which degrades the spark discharge intensity or can prevent ignition. Varnish and other combustion by-products, particularly due to incomplete combustion and fuel evaporation, also can deteriorate plug performance. As a result, very high energy must be delivered to the spark plug to insure that carbon and fuel deposits are literally blown off the electrodes to produce an adequate spark.

The objectives exist, therefore, for better and more reliable and more efficient apparatus and methods for initiating fuel combustion.

SUMMARY OF THE INVENTION

To the accomplishment of the forgoing objectives, the invention provides, in one embodiment, an apparatus for igniting fuel that uses an electrostatic fuel nozzle that produces an atomized fuel spray; and a catalytic igniter for igniting the atomized fuel spray.

The invention also contemplates the methods embodied in the use of such apparatus, as well as a method for igniting fuel comprising the steps of:

a. producing an electrostatically atomized fuel spray; and b. igniting the spray using a catalytic igniter.

These and other aspects and advantages of the present invention will be readily understood and appreciated by those skilled in the art from the following detailed description of the preferred embodiments with the best mode contemplated for practicing the invention in view of the accompanying drawings.

BRIEF DESCRIPTION OF THE DRAWINGS

FIG. 1A is a more detailed schematic diagram of another embodiment of the invention in partial longitudinal cross-section;

FIG. 1B is an illustration of a combustor exemplifying an application of at least one embodiment of the invention.

FIG. 2 is an end elevation of the ignition apparatus illustrated in FIG. 1A.

DETAILED DESCRIPTION OF THE INVENTION

Figure 1:
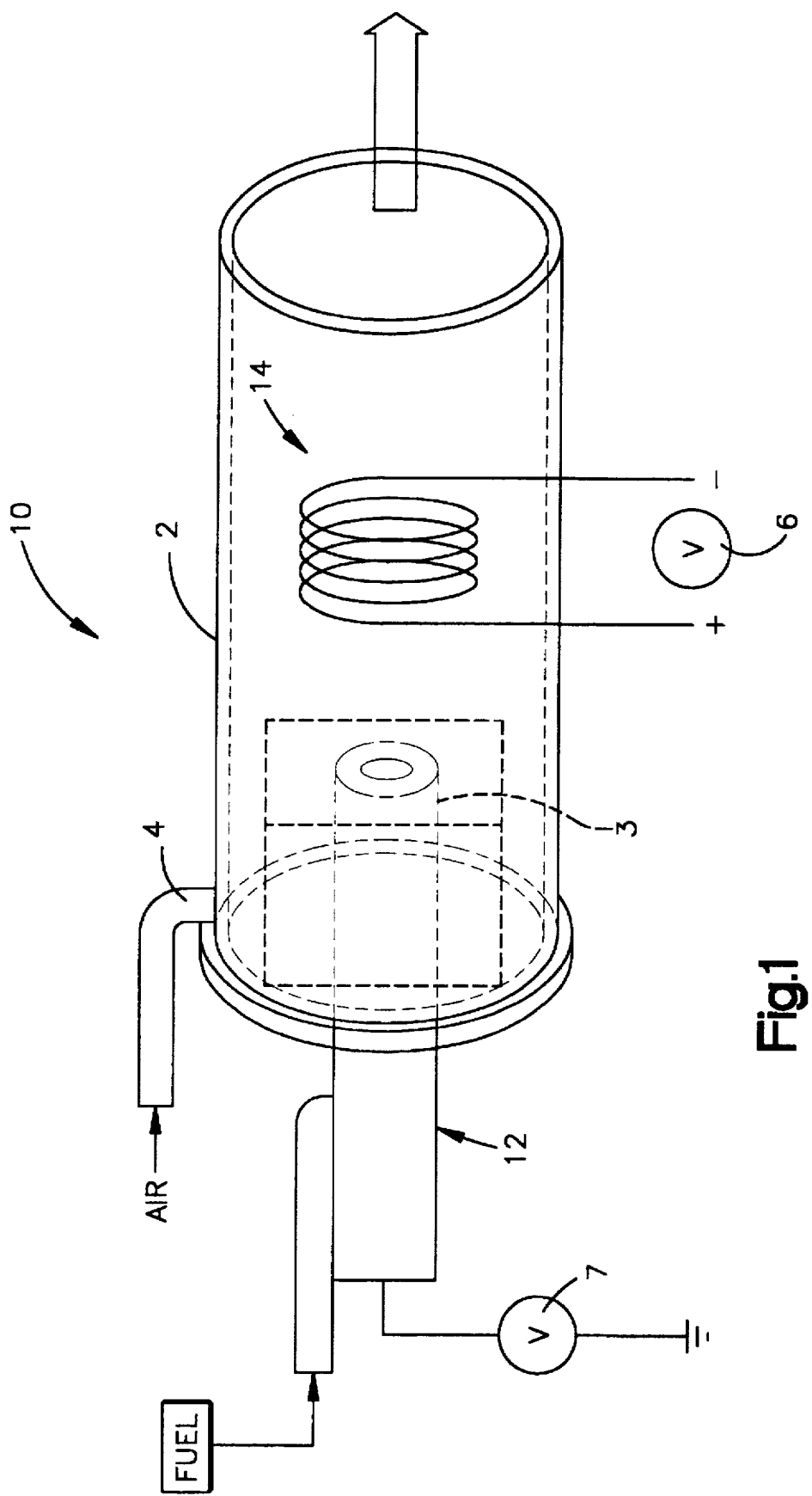
FIG. 1 is a simplified schematic diagram of one embodiment of the invention.

With reference to the drawings, an apparatus for igniting fuel is generally designated with the numeral 10. As shown in the illustration of FIG. 1B, the apparatus 10, and the invention in general, can be used with any combustor 1 in which it is desired to initiate combustion of a fuel 8; for example, the apparatus 10 can be a direct replacement for a conventional spark plug or glow plug igniter or torch burner. The apparatus 10 can further be used to introduce or inject a combustion or plasma 9 for initiating, maintaining and/or restarting a combustion process fueled by a primary fuel source 11 such as, for example, a main fuel nozzle 13. Additionally, the apparatus 10 can be used, for example, as a main fuel supply to a combustor. These and other uses and applications of the present invention will be readily apparent to those skilled in the art, with the descriptions herein of various embodiments and alternatives being intended to teach, illustrate and exemplify the concepts, benefits and advantages of the invention; and accordingly such detailed descriptions should not be viewed in a limiting sense as to the structure, use and application of the invention.

As generally illustrated in FIG. 1, and in more detail in the other figures (wherein like reference numerals are used for like components), the apparatus 10 includes an electrostatic nozzle assembly 12 and a catalytic igniter 14. In the simplified illustration of FIG. 1, the nozzle assembly 12 is disposed in an igniter tube 2 and held in place therein using a nozzle mounting block 3. The mounting block 3 can be machined so that the nozzle 12 is press fit into the mounting block with the nozzle spray orifice 50 disposed generally flush or near the down stream mounting block end. The mounting block 3 may be made of aluminum, for example, and press fit inserted into the tube 2 just forward of an air inlet port 4. The aft end of the igniter tube 2 (as viewed in FIG. 1) is sealed such as with an end cap 5. In this manner, air flow into the tube 2 through the port 4 is forced to flow around the block 3 and a forward direction towards the catalytic igniter 14. The catalytic igniter 14 in this case can be, for example, a simple catalytic coated resistive wire such as 0.045 diameter Hast-X with platinum as the catalyst. An electrical energy source 6 is connected to the catalytic igniter, and a high voltage supply 7 is connected to the fuel nozzle 12.

The catalytic igniter 14 is disposed in the tube 2 (in the embodiment of FIG. 1 the igniter is stood off from the tube wall) so as to be generally in the flow of the fuel/air spray. In this manner, the igniter is exposed to the fuel/air mixture and, when sufficiently heated, ignites the mixture. Lightoff has been effected, for example, with an electrostatic nozzle operating at about 7 KV and the igniter operating at a voltage drop of about 7 volts and a wire current of approximately 19 amps.

The nozzle 12, in accordance with the invention, is an electrostatic atomization nozzle, as will be described in more detail hereinafter.

In the embodiment of FIG. 1A, the nozzle 12 and igniter 14 are disposed in a common housing or casing 16 to form a self-contained integral assembly that can conveniently be mounted on or in a combustor wall as shown in FIG. 1B, for example. For this purpose, the casing 16 can be provided with or attached to an end mounting flange 18 or a male/female screw mount or bayonet mount arrangement can be used, for example. An orifice 20 is provided in the casing at an outlet end 22 thereof and extends longitudinally from the nozzle spray outlet generally along an axis that is collinear with the central axis of the fuel spray. In the embodiment of FIG. 1A, the outlet orifice 20 is defined by an inner frusto-conical contour or surface 20a that is formed in the casing 16. A multiple orifice outlet could be used for specific applications requiring such a structure.

The casing 16 may be made of a high temperature, high conductivity material, such as stainless steel, for example. The nozzle assembly 12 and catalytic igniter 14 are held in the casing by a high temperature, electrically insulative spacer 24 which is installed in the casing 16 by any convenient means such as brazing at the nozzle and at the casing body. The spacer 24 may be made of a fired ceramic such as alumina ($Al_2O_3$) having metallized surfaces for brazing to the casing 16 and the nozzle 12.

The ceramic spacer 24 will not degrade from exposure to the high temperatures and fuel at the injector orifice 20. The spacer 24 also provides excellent electrical isolation because the casing typically is electrically grounded and the nozzle 12 may use high voltage potentials, as can the igniter 14.

The casing may be hermetically sealed and filled with dry nitrogen or other appropriate inert gas. Alternatively, the casing 16 may be filled with alumina 26 or similar ceramic power packing material.

The entire casing could also be made of ceramic if so desired for a particular application, rather than stainless steel, and machined or molded to the desired configuration for holding the catalytic igniter and nozzle. For example, a high density ceramic with low electrical conductivity could be used, such as alumina. Cavities (lined or unlined) can be formed in the ceramic casing for passing electrical conductors and fuel through the casing to the nozzle 12 and igniter 14.

The catalytic igniter 14 includes a resistive element 30 such as nichrome that is coated with a noble metal catalyst such as platinum. Several available processes for making such an igniter are described in the following patents: U.S. Pat. Nos. 4,896,636 and 5,146,881, the entire disclosures of which are fully incorporated herein by reference.

With reference to FIG. 2 as well, in this embodiment the catalytic element 30 is disposed adjacent to the insert 24 about the periphery of the conical surface 20a, in a coiled or helical manner, along the length of the orifice 20a. A helical groove 25 can be machined, molded or otherwise formed in the insert 24. The ribbon-like igniter element 30 can be simply laid in the groove, press fit or cured therein as desired. In FIG. 1A, the element 30 is shown partially recessed below the surface 20a of the insert 20. Alternatively, the element 30 could be fully recessed at or below the surface 20a, or the groove 25 could be omitted and the element 30 simply disposed adjacent the surface 20a. In this case, the element 30 could be held in place by electrical connection at either end thereof. The term "adjacent" as used in the context of the position of the igniter element 30 with respect to the surface 20a, should be construed broadly and intended to include having the element 30 at or on the surface 20a, partially or fully recessed therein, or stood off somewhat from the surface (such as for example as shown in FIG. 1). Those skilled in the art will understand that these and other alternatives are readily available to the designer, and the selection for a particular application will depend in part on the operational characteristics of the selected igniter as well as the flow characteristics/pattern of the air/fuel spray.

The use of a helical type pattern increases the overall length of the igniter 14 thereby increasing its resistance as well as its exposure to the fuel spray from the nozzle 12. However, other shapes and arrangements besides a helix could also be used and will be readily apparent to those skilled in the art. For example, a star pattern could be used.

As best illustrated in FIG. 2, the distal end 32 of the catalytic element 30 contacts or otherwise is connected to the conductive casing 16, such as indicated at the numeral 34. This electrical contact point serves as an electrical return for current flow through the catalytic element 30. Alternatively, for applications in which the casing body is not electrically grounded, or is made of a low conductivity ceramic, for example, the distal end of the element 30 can be electrically connected to the return of a power source by an electrical conductor passed through the casing body (in a manner similar to the electrical connection to the igniter end 36 described hereinafter). The opposite end 36 of the catalytic element 30 is positioned proximate the nozzle 12.

An air vent 40 is formed or otherwise provided in the casing 16 and opens at an inlet end 42 to a plenum or other air passageway that is part of the combustor system that the apparatus 10 is used with (not shown). The air vent 40 opens at an outlet port 44 to the orifice 20. The location of the air port 44 with respect to the nozzle 12 will depend on the particular nozzle used, the nozzle orifice design, as well as other design variables such as the pressures and flow rates involved. In general though, the air port 44 will typically be located between the nozzle 12 spray orifice 50 and the proximate end 36 of the catalytic element 30. The port 44 can open somewhat tangentially to the conical surface 20a in order to facilitate a swirling air flow about the orifice 20, thus improving the air fuel mixture for ignition. Additional air vents 40 and/or ports 44 can be used when needed for adequate air supply.

The electrostatic atomization fuel nozzle 12 is a commercially available device that produces a very fine fuel spray that is easier to ignite than a conventional air blast or fuel pressure nozzle. The nozzle 12 may be, for example, the type of nozzle described in U.S. Pat. Nos. 4,255,777; 4,380,786; 4,581,675; 4,991,774 and 5,093,602 issued to Kelly, the entire disclosures of which are fully incorporated herein by reference. Such nozzles are commercially available from Charged Injection Corporation, such as a series 18 Spray Triode® and a SPRAYTRON™ nozzle.

In simple terms, the electrostatic nozzle 12 injects electrons into the fuel thereby electrostatically charging the fuel. In the case of the Spray Triode® nozzle, the electrons are injected, for example, by disposing a high voltage conductor in contact with the fuel of the nozzle. Of course, other injection techniques may be used. Once charged, the fuel exits the nozzle orifice 50 where electrostatic repulsive forces begin to act on the fuel stream. Since these repulsive forces far exceed the hydrodynamic forces which normally determine fuel droplet size, the result is stream fragmentation into very small droplets near the stream periphery with a narrow droplet distribution. Consequently, fuel droplet size has been found to be virtually independent of fuel viscosity and the nozzle operating pressure (i.e. delta pressure). As the droplet size decreases from 120 microns to 20 microns the required ignition energy decreases from 100 millijoules to less than 10 millijoules. Additionally, the use of an electrostatic nozzle in accordance with the present invention provides droplet average size control for the apparatus 10 which is independent of fuel flow, and can be used to expand the combustor operating envelope for ignition and stability.

The invention is not limited to any particular nozzle orifice design such as described herein. For example, the nozzle outlet orifice 50 can be conical (to produce a hollow core spray), a slit, or other geometric opening resulting in various spray patterns. The particular orifice 50 design used in the apparatus 10 will be determined by the particular application, operating conditions and environment, and ignition requirements.

A particular advantage of the electrostatic fuel nozzle 12 is that, in combination with the orifice 20 and use of air vents and/or swirlers (as described hereinafter), the shape or geometry of the burning fuel can be easily controlled by controlling the voltage potential input applied to the nozzle 12. The lower the voltage, the larger the fuel droplet size and hence the narrower and cooler the plasma or flame. At applied higher voltages, the atomization is finer so that the plasma or flame widens with a larger volume and burns more intensely (brighter and hotter).

The nozzle 12 applies electrical charge to the fuel by means of a high voltage conductor 52 that is connected at one end to a terminal 54 at the nozzle 12 voltage input. The other end of the conductor 52 is coupled through a high voltage electrical connector 56 and is connected to a high voltage supply 58. The conductor 52 can pass through the casing 16 via tubular cavities as explained herein. The high voltage supply 58 may be conventional in design and preferably can be controlled to provide a selectable output voltage depending on the combustion characteristics desired. Typically, the nozzle 12 requires about 5000 to 20,000 VC and microamperes of current for producing a fuel spray with droplet sizes of about 50 to 20 microns.

The catalytic element end 36 that is proximate the nozzle 12 is electrically connected or coupled to an electrical conductor 60. The conductor 60 passes through the casing 16 and the electrical connector 56 in a manner similar to the nozzle conductor 52. The igniter conductor 60 is connected to an igniter power supply 62, which for convenience can be part of the same supply 58 used for the nozzle, all of which can be produced by a main power source 64 if so desired. Separate supplies can be used and the supplies 58, 62 can be located remotely from the apparatus 10 for applications where such an arrangement would be feasible and convenient. As shown, the conductors 52, 62 can be routed through a shielded cable 66. The supplies 58, 62 can include conventional regulator, timing and control circuits for controlling the amount of time that power is applied to the catalytic element 30, as well as when and for how long power is applied to the fuel nozzle to provide the desired fuel spray. The fuel source 70 can also be provided with conventional control apparatus for regulating the fuel supply as to flow rate and pressure, for example.

A hole 38, such as a metallic feedthrough similar to a plated through hole in a circuit board, is provided in the spacer 24. The terminal end of the conductor 60 is attached to a pin 39 that passes through the hole 38 and is brazed or otherwise attached to the proximate end 36 of the igniter element 30. The conductor 60 connection to the element 30 could alternatively be accomplished by simply holding the conductor in tension against the element 30. A metallized feedthrough is not required, and the conductor 60 could simply pass through a small hole formed in the insert 24.

Fuel for the electrostatic nozzle 12 is supplied from a fuel supply 70 via fuel line 72 (FIG. 1A) through a suitable fitting 74 into a casing cavity or metal tube 76 to a nozzle fuel inlet port 78. Detailed operation of the nozzle 12 is provided in the referenced patents.

Operation of the apparatus 10 is straightforward. To initiate combustion of the fuel, electrical energy is applied to the catalytic element 30 via the conductor 60 and the casing return. The resistance of the element causes a substantial heating of the catalytic element. After a selectable time period after which the element 30 is hot enough to ignite the fuel, fuel delivery through the nozzle 12 is initiated, with the nozzle 12 producing a fine fuel spray (indicated in FIG. 1A with the dotted directional lines 80). The catalytic coating on the element 30 assists the ignition process. As an example, for a fuel such as jet fuel, a catalytic coating of platinum on a resistive material such as nichrome can be heated to about 900° C. to initiate combustion. The actual ignition system light off time will depend, for example, on the air flow, fuel flow and system operating voltage/current, which are some of the factors that represent the requirements set forth by the combustion engineering parameters for the end application, as will be understood by those skilled in the art.

After the fuel is ignited, the plasma or flame geometry can be controlled by adjustment of the applied voltage to the nozzle 12. The heat of the burning fuel in many cases will maintain the element 30 hot enough so that electrical power to the element 30 can be removed while maintaining ignition of fuel ejected from the nozzle. Should the combustion be interrupted, either intentionally by fuel shutoff, or for other reasons (flame out), or if the combustion temperature drops below that needed to ignite fuel from the nozzle, the catalytic element can be re-heated by applying power thereto so as to ignite the fuel spray.

Figure 3:
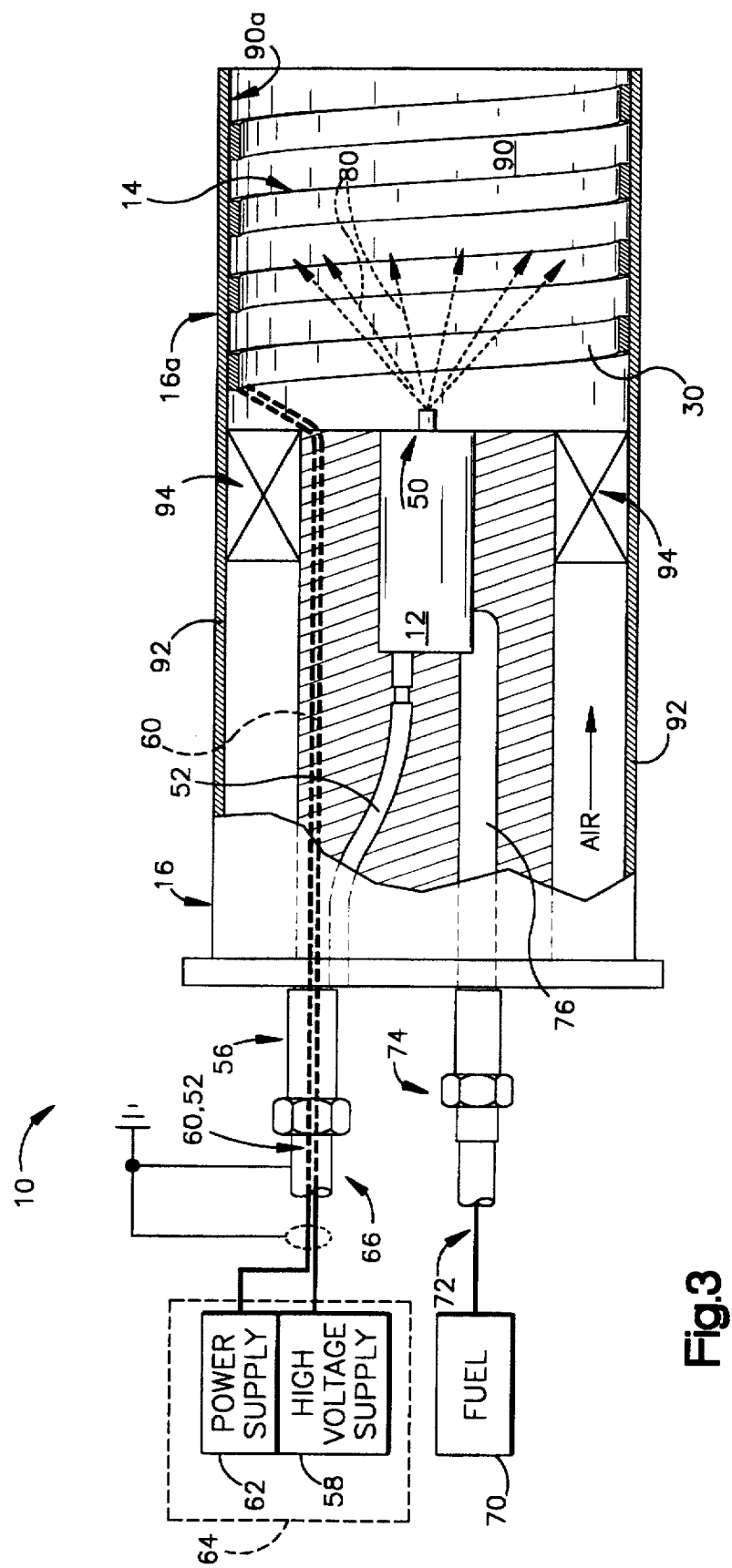
FIG. 3 illustrates another embodiment of the invention.

With reference to FIG. 3, an alternative embodiment of the apparatus 10 is shown for the casing 16 and orifice 20. Many of the elements in FIG. 3 perform the same function as the corresponding elements in FIGS. 1 and 2, therefore like reference numerals are used and their description need not be repeated.

In this embodiment, the casing 16 again has a generally cylindrical envelope as in FIG. 1A, except that the longitudinally extended portion beyond the nozzle outlet orifice 50 forms a generally cylindrical orifice 90. The extension 16a can conveniently be made part of or integral with the main body of the casing 16, or can be a separate (attached or unattached) section, as determined for each particular application. As in the first embodiment, the catalytic element 30 is disposed in a coiled or helical manner about the inner periphery of the surface 90a that defines the orifice 90.

An alternative to the generally transverse air vents 40 is also provided. In this case, air is supplied from outside the casing 16 via air passageways 92. The passages 92 can be separately formed in the casing as needed, or for convenience the passageway 92 can be an annulus about the outer periphery of the casing 16 body. The nozzle 12, conductors 52, 60 and fuel line 76 can be supported within such an annulus by any convenient means readily apparent to those skilled in the art (such as for example using a plug type or cylinder insert that is held in place at the swirlers and an end plate).

One or more aerodynamic swirlers 94 are disposed in the air passages 92 proximate the outlet orifice of the nozzle 12. The swirlers can be used to impart a rotating more turbulent air flow through the orifice 20 to improve the air/fuel mixing. This is particularly useful with the embodiment of FIG. 3 because the generally cylindrical orifice 20 will tend to simply pass the air flow axially (whereas in the embodiment of FIG. 1A swirlers could also be used if desired, however, in many applications they will not be needed because the frustoconical orifice and surface will tend to impart a swirling air flow to improve the air/fuel mix). The swirlers 94 can also be designed in a known manner to cause a recirculating air flow downstream from the nozzle orifice 50 to increase the exposure of the air/fuel mixture to the catalytic igniter 12.

Operation of the apparatus illustrated in FIG. 3 is substantially the same as for FIG. 1A, except as to the already described use of the cylindrical orifice 90 and the swirlers 94.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. Apparatus for producing a flame to ignite in a combustor combustor fuel supplied by a main fuel nozzle, said apparatus comprising: a housing including a main body and an orifice for providing a passageway into said combustor; an electrostatic atomization fuel nozzle disposed in said main body for injecting an atomized fuel spray into said orifice; a catalytic element disposed distributedly adjacent a main body inner surface that defines part of the orifice for igniting the atomized fuel spray to produce said flame such that said flame is emitted beyond the orifice and into the combustor to ignite the combustor fuel; and an electrical energy source for supplying a variably controlled energy level to said electrostatic atomization fuel nozzle to control the profile of said emitted flame.

2. The apparatus of claim 1 wherein the nozzle includes a fuel inlet connectable to a fuel supply and an electrical input for supplying electrical energy used to electrostatically atomize the fuel.

3. The apparatus of claim 1 wherein the catalytic element is disposed in close proximity to a fuel spray outlet of the nozzle, the element being connectable to an electrical energy source.

4. The apparatus of claim 3 wherein the catalytic element comprises platinum.

5. The apparatus of claim 1 wherein the orifice is frustoconical along its longitudinal axis to provide a longitudinally increasing radial volume for the fuel spray ejected by the nozzle.

6. The apparatus of claim 1 wherein the orifice comprises a cylindrical portion that extends axially from said electrostatic nozzle fuel spray outlet.

7. The apparatus of claim 6 wherein the catalytic element is disposed as a helix along an inner surface of the cylindrical portion that defines the orifice.

8. The apparatus of claim 1 wherein the catalytic element is partially recessed in a groove formed in the inner surface.

9. The apparatus of claim 1 wherein the orifice is separate from said main body of the housing and attached to one end of the housing.

10. The apparatus of claim 1 wherein the orifice is defined by a surface formed in the housing, which surface extends lengthwise from the nozzle in a direction in which generally the nozzle ejects the fuel spray.

11. The apparatus of claim 10 wherein the surface is frustoconical in longitudinal section.

12. The apparatus of claim 10 wherein the surface is cylindrical in longitudinal section.

13. The apparatus of claim 10 wherein the catalytic element is disposed as a helix adjacent the surface.

14. The apparatus of claim 10 wherein the catalytic element comprises a catalyst coated resistive element disposed on the surface.

15. The apparatus of claim 10 wherein the housing comprises ceramic material, the extension also comprising a ceramic material that forms a surface with the catalytic element disposed adjacent thereto.

16. The apparatus of claim 15 further comprising an electrical energy source connected to the catalytic element such that current through the element causes the element to heat sufficiently to ignite the fuel spray from the nozzle.

17. The apparatus of claim 1 wherein the housing includes a passageway for admitting air into the orifice.

18. The apparatus of claim 17 further comprising a swirler disposed in the air passageway to produce a turbulent air stream that mixes with the fuel spray.

19. The apparatus of claim 1 wherein the electrical energy source that supplies a variably controlled energy level to the nozzle for adjusting the fuel droplet size produced by the nozzle.

* * * * *